United States Patent
Choi

(10) Patent No.: US 8,885,498 B2
(45) Date of Patent: Nov. 11, 2014

(54) NETWORK TRAFFIC AGGREGATION METHOD AND DEVICE FOR IN-VEHICLE TELEMATICS SYSTEMS USING TETHERING AND PEER-TO-PEER NETWORKING OF MOBILE DEVICES

(75) Inventor: Yong Hoon Choi, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 944 days.

(21) Appl. No.: 12/977,345

(22) Filed: Dec. 23, 2010

(65) Prior Publication Data

US 2012/0163255 A1    Jun. 28, 2012

(51) Int. Cl.
| | |
|---|---|
| *H04J 3/02* | (2006.01) |
| *H04L 29/08* | (2006.01) |
| *H04W 4/18* | (2009.01) |
| *H04W 4/04* | (2009.01) |
| *H04W 4/00* | (2009.01) |

(52) U.S. Cl.
CPC ............... *H04L 67/06* (2013.01); *H04L 67/10* (2013.01); *H04L 67/12* (2013.01); *H04W 4/18* (2013.01); *H04W 4/046* (2013.01); *H04W 4/006* (2013.01)
USPC ............ 370/252; 370/474; 370/537; 370/542

(58) Field of Classification Search
None
See application file for complete search history.

(56) References Cited

U.S. PATENT DOCUMENTS

| | | | | |
|---|---|---|---|---|
| 7,098,943 | B2* | 8/2006 | Shibutani | 348/211.1 |
| 7,814,146 | B2* | 10/2010 | Chavez et al. | 709/203 |
| 8,503,483 | B2* | 8/2013 | Foley | 370/503 |
| 2008/0167758 | A1 | 7/2008 | Louch | |
| 2008/0320156 | A1* | 12/2008 | Chen et al. | 709/230 |
| 2009/0024754 | A1 | 1/2009 | Setton | |
| 2009/0262714 | A1 | 10/2009 | Lim | |
| 2011/0116444 | A1* | 5/2011 | Relyea | 370/328 |

* cited by examiner

*Primary Examiner* — Alex Skripnikov
(74) *Attorney, Agent, or Firm* — Leydig, Voit & Mayer, Ltd.

(57) ABSTRACT

A method for enhancing a data communication throughput associated with an in-vehicle telematics system includes receiving a communication request from the in-vehicle telematics system to perform at least one of a data upload to the Internet and a data download from the Internet, and verifying availability of one or more mobile devices within the vehicle. The maximum capability of a mobile network interface for each of the one or more available mobile devices within the vehicle is determined. When the communication request is for uploading data to the Internet, the data is fragmented into data fragments and distributed to the available mobile devices, whereas when the communication request is for downloading data from the Internet, it is determined for each mobile device which fragment of data is to be downloaded and from which server, and the respective determined fragments are received from each mobile device.

17 Claims, 4 Drawing Sheets

NETWORK TRAFFIC AGGREGATION METHOD AND DEVICE FOR IN-VEHICLE TELEMATICS SYSTEMS USING TETHERING AND PEER-TO-PEER NETWORKING OF MOBILE DEVICES

FIELD

This disclosure relates to a network traffic aggregation method and device which allows an in-vehicle telematics system to utilize a collection of mobile devices carried by a driver and/or passengers for enhancing its data communication throughput.

BACKGROUND

The telematics systems in many modern cars have mobile wireless network interfaces for connecting to the Internet. Through the mobile wireless networks, such systems exchange various data types and sizes ranging from small-sized traffic/safety messages to large-volume multimedia data. Due to the throughput limitations of the mobile wireless networks, however, downloading or uploading large-volume multimedia via the telematics system is often unacceptably slow. For example, if the average throughput associated with a mobile network interface is 2 Mbps (250 kB/s) and the size of a movie is 600 MB, downloading the movie via the mobile network interface would take approximately 40 minutes. Such a delay is so substantial as to effectively preclude use of the network for such tasks.

SUMMARY

In an embodiment of the invention, a method is provided for enhancing a data communication throughput associated with an in-vehicle telematics system comprising. The method entails receiving a communication request from the in-vehicle telematics system to perform a data upload to the Internet and/or a data download from the Internet, and verifying availability of one or more mobile devices within the vehicle. A maximum capability of a mobile network interface for each of the one or more available mobile devices within the vehicle is determined. When the communication request from the in-vehicle telematics system is for uploading data to the Internet, the data is fragmented and the fragments are distributed to the available mobile devices. When the communication request is for downloading data from the Internet, data fragments and source servers are identified and the respective fragments are received from each mobile device.

In another embodiment of the invention, a system is provided for communicating from a vehicle over the Internet. The system comprises an in-vehicle telematics unit for wirelessly communicating from the vehicle over a network, a traffic aggregator connected to the in-vehicle telematics unit, and one or more mobile devices. The traffic aggregator is configured to receive a request from the in-vehicle telematics unit to exchange data to or from a server on the Internet, and to distribute data communications tasks associated with the exchange among the mobile devices using a tethering connection between the traffic aggregator and the mobile devices. The distribution of data communications tasks among the mobile devices is based on network capabilities of the mobile devices.

In yet another embodiment of the invention, a method is provided for enhancing communications bandwidth of an in-vehicle telematics unit. The method entails identifying one or more mobile communications devices within the vehicle and wirelessly tethering to the devices. The bandwidth capability of each mobile communications device is determined, and parts of a communications task are distributed among the mobile communications devices. The communications task may include a data upload to the Internet and/or a data download from the Internet.

BRIEF DESCRIPTION OF THE DRAWING(S)

DETAILED DESCRIPTION

Figure 1:
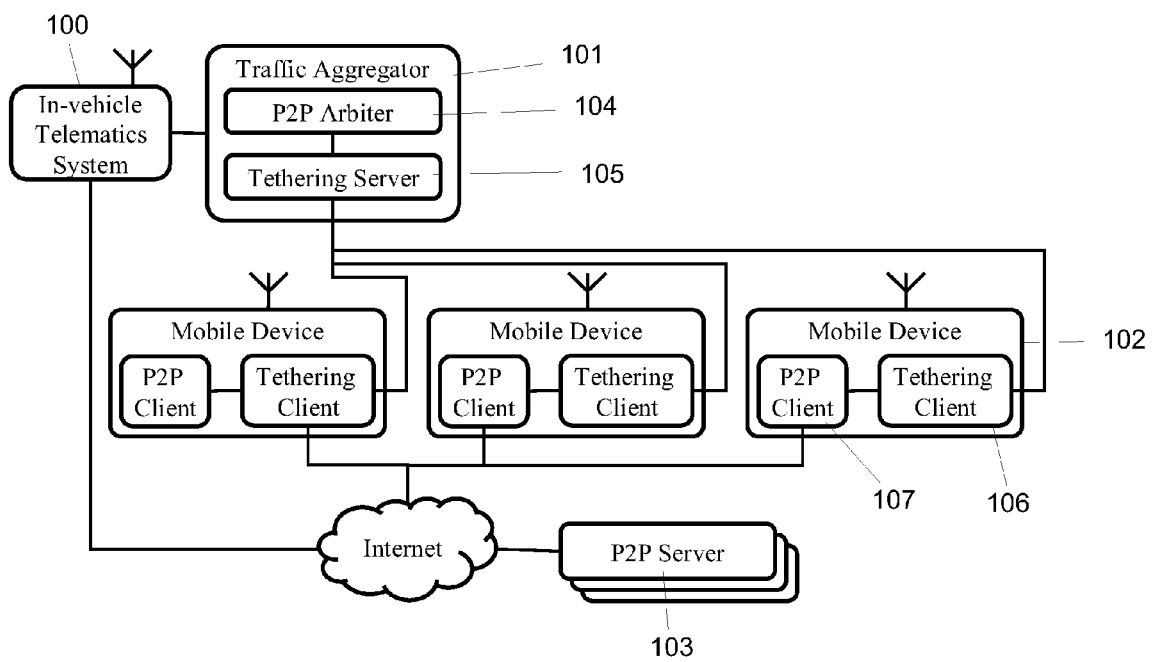
FIG. 1 depicts the system architecture of an embodiment of the invention.

This invention relates to a network traffic aggregation method and device which allows an in-vehicle telematics system to utilize a collection of mobile devices carried by a driver and/or passengers for enhancing its own data communication throughput. An in-vehicle traffic aggregation device receives communication requests from the in-vehicle telematics system. It constructs a communication network to each mobile device using tethering so that the telematics system can access the Internet not only via its own mobile network interface but also via the mobile devices' mobile network interfaces.

The traffic aggregation device first collects the availability and network capability (e.g. throughput and/or latency) of each mobile device via tethering connection. Tethering is the use of a mobile device such as a mobile phone to supply Internet access for another device. The mobile device is thus treated as an access point to which other devices connect via Bluetooth, WiFi, USB or other means. If the communication request from the telematics system is for uploading data to the Internet, the traffic aggregation device fragments the data into small chunks and distributes them into mobile devices via the tethering connection. The amount of data assigned to each mobile device is proportional to the device's network capability. Finally, each mobile device attempts to deliver the assigned data to the Internet destination.

If the communication request from the telematics system is for downloading data from the Internet, the traffic aggregation device retrieves the profile (server location, size, fragmentation size, number of fragments, etc.) of the data to be downloaded from the P2P server via the Internet. A peer-to-peer network, commonly abbreviated P2P, is any distributed network architecture composed of participants that make a portion of their resources (such as processing power, disk storage or network bandwidth) directly available to other network participants, without the need for central coordination instances (such as servers or stable hosts).

The device's P2P arbiter determines which mobile device is to download what fragments of data from which server. Based on this traffic allocation decision, each mobile device downloads the assigned fragments of data from the Internet source and sends them to the P2P arbiter via the tethering connection. Finally, the P2P arbiter aggregates all fragments that constitute the desired data and sends the aggregated final data to the in-vehicle telematics unit.

This system reduces the transmission/reception time of data by orders of magnitude by collectively utilizing in-vehicle mobile devices' network capabilities. It also distributes communications loads into mobile devices based on mobile devices' network capability. This network-capability-aware traffic distribution via the P2P Arbiter of the device maximizes the chance to complete a communication request (transmission or reception) in an optimal way. If the in-vehicle telematics system is subscribed for a limited data service plan, excessive data transfer beyond the data limit may result in additional charges. By smartly distributing the large volume of a traffic load into multiple mobile network devices, the intended data communication can sometimes be performed with a lesser additional service charge.

An exemplary architecture in an embodiment of the invention is shown in FIG. 1, The overall system consists of an in-vehicle telematics system 100, Traffic Aggregator 101, one or more mobile devices 102, and P2P Server 103 on the Internet. The in-vehicle telematics system 100 provides various mobile services to drivers and passenger in the vehicle. Examples of services include Hands-Free Calling, navigation, contacts/schedule management, music/movie downloading/playing, FM/AWFID/1nternet radio, and so on. The telematics system 100 may or may not be equipped with a mobile network interface (e.g., GSM, CDMA, WCDMA, HSDPA, etc.) that provides access to the Internet.

Traffic Aggregator 101 is connected to the in-vehicle telematics system 100 via a wired or wireless connection. It receives communication requests from the in-vehicle telematics system such as to download a movie from a server on the Internet or upload vehicle diagnostic information to a server on the Internet. The Traffic Aggregator 101 then distributes communication tasks to mobile devices 102 in the vehicle using the tethering connection between the Traffic Aggregator 101 and the mobile devices 102.

Specifically, P2P Arbiter 104 in the Traffic Aggregator 101 receives the communication requests, divides a large communication traffic load into multiple small loads, and distributes the multiple communication tasks to the one or more mobile devices 102 based on the network capability information of the mobile devices 102. Tethering Server 105 in the Traffic Aggregator 101 provides an access point to which one or more mobile devices 102 connect via wired or wireless networks such as Bluetooth, WiFi, USB or other means so that Traffic Aggregator 101 utilizes the collective communication capability of the all the mobile devices 102 in the vehicle for delivering data to/from the in-vehicle telematics system.

Mobile devices 102 are carried by individuals including a driver and potentially passengers in the vehicle and equipped with a mobile network interface that provides access to the Internet. Examples of mobile device include but are not limited to smart phones, laptops and tablet devices. Communicating over the mobile network usually requires a subscription for communication service plan provided by telecommunication network operators.

In addition, these mobile devices are generally equipped with another communication interface, such as Bluetooth, WiFi, USB or other means, so that Tethering Client 106 can create a tethering connection to Tethering Server 105 in the Traffic Aggregator 101. Over the tethering connection, communication upload/download requests, mobile device's network status, and the telematics system's application data to be delivered from/to the Internet are delivered between Traffic Aggregator 101 and mobile devices 102.

The P2P Client 107 receives a communication request from the P2P Arbiter 104 through the tethering connection. The communication request may include but is not limited to the profile (server location, size, fragmentation size, number of fragments, etc.) of the telematics system's application data to be downloaded from or uploaded to the P2P server 103 via the Internet. Subsequently, the P2P Client 107 performs the requested communication tasks (upload/download) interfacing with the P2P server 103 on the Internet.

Figure 2:
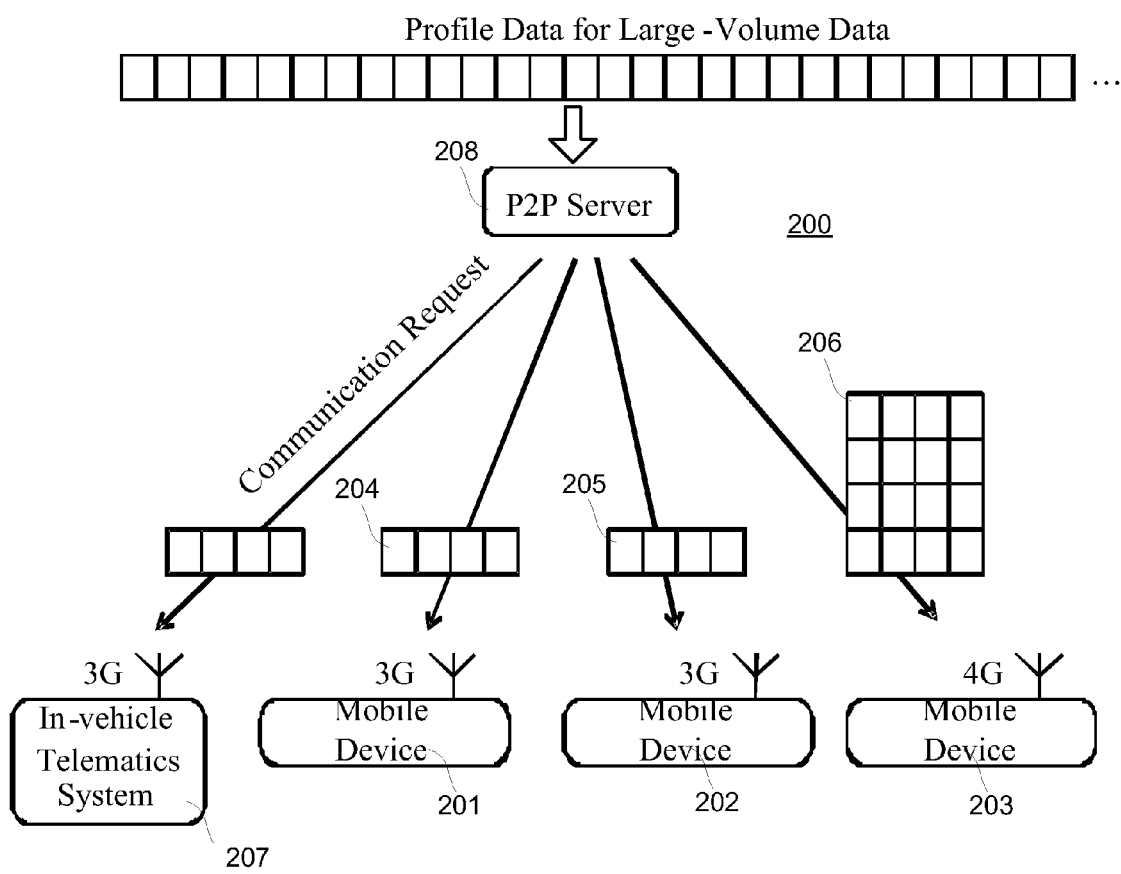
FIG. 2 depicts an example of network capability-aware communication load distribution to mobile devices.

The capability-aware network load distribution scheme used in P2P Arbiter of Traffic Aggregator in accordance with the described principles ensures that the amount of data traffic assigned to each mobile device is proportional to the device's network capability as shown in FIG. 2. For example, assume an environment 200 wherein there exist three mobile phones 201, 202, 203, each of which has a different maximum throughput capability 204, 205, 206. Two of them 201, 202 have a 3G mobile network interface and another 203 has a 4G mobile network interface. The in-vehicle telematics system 207 also has a 3G mobile network interface. The in-vehicle telematics system 207 is to download a movie of 600 MB. The P2P Arbiter at the P2P server 208 divides the target file into multiple pieces of the same size and requests the mobile phones 201, 202, 203 to download different data pieces. The number of data pieces in request to each mobile phone 201, 202, 203 is proportional to the maximum throughput of each mobile network interface. If the throughputs for the 3G and 4G 203 network are 5 Mbps and 20 Mbps, respectively, then the 4G-equipped mobile phone 203 will receive and process four times more download requests than the 3G-equipped mobile phones 201, 202.

Figure 3:
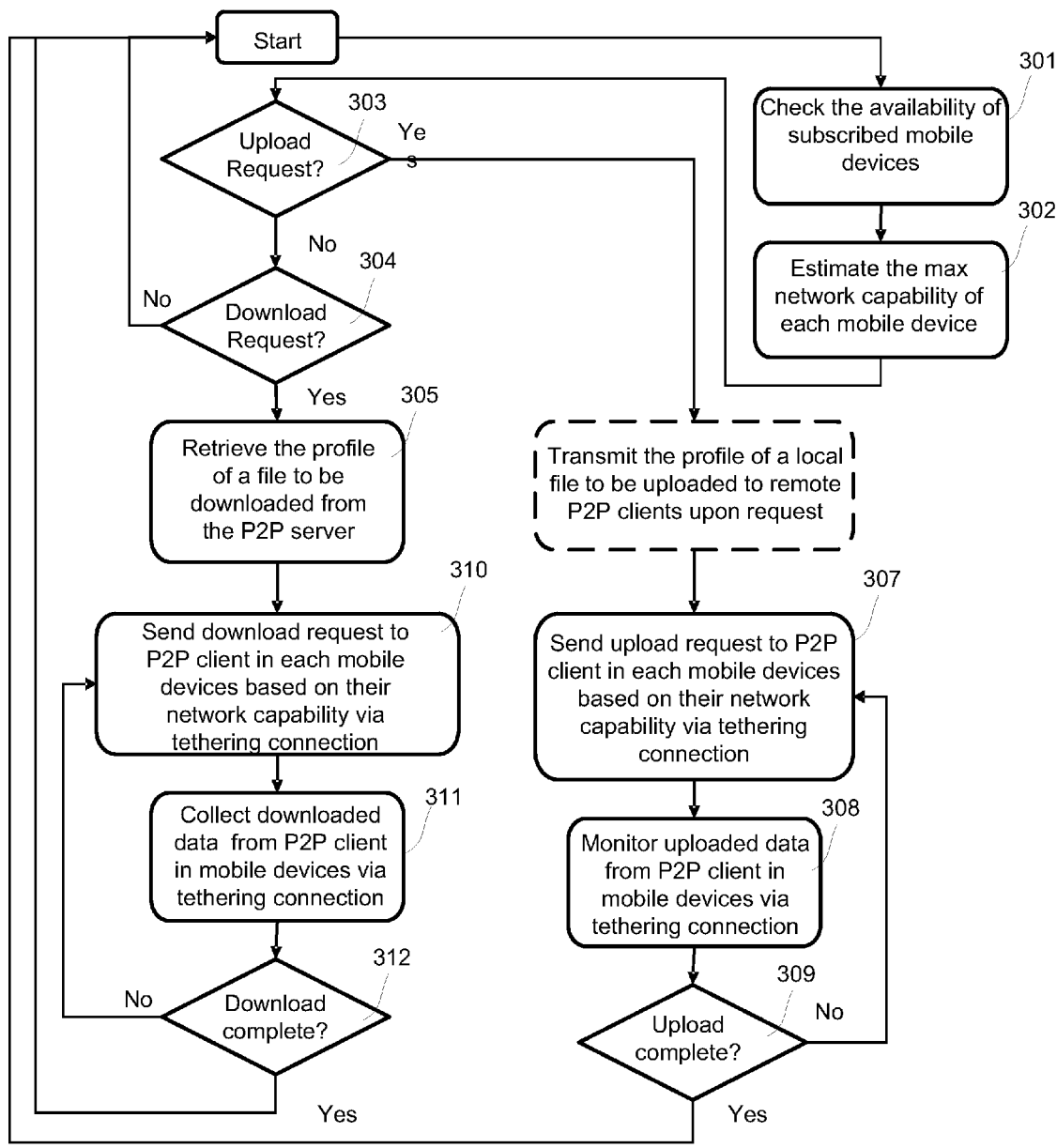
FIG. 3 depicts the flow chart of an embodiment of the invention.

FIG. 3 depicts the logical flow of a process 300 according to an embodiment of the invention. Once the Traffic Aggregator receives a communication request from the in-vehicle telematics system, the Tethering Server in the Traffic Aggregator checks the availability of all the mobile devices in the vehicle at stage 301 by trying to make a tethering connection to each mobile device so that it makes sure which mobile devices are available for communicating data via Internet on behalf of the in-vehicle telematics system. Then, the P2P Arbiter in the Traffic Aggregator collects or estimates the maximum capability of the mobile devices' mobile network interface from mobile devices at stage 302. The possible metric for network capability includes but is not limited to throughput and latency in an embodiment of the invention.

At stage 303, if the communication request from the telematics system is for uploading data to the Internet, the device fragments the data into small chunks of data and distributes them into mobile devices via tethering connection at stage 307 after optionally transmitting the profile of the local file to be uploaded to the P2P clients upon request. The amount of data assigned to each mobile device is proportional to the device's network capability. This network capability-aware communication load distribution is described in FIG. 2.

Each mobile device is tasked to provide its best effort to deliver the assigned data to the Internet destination. The P2P Arbiter keeps monitoring the transmission status of each mobile device at stage 308 until the entire body of data is delivered to the destination server on the Internet. The Arbiter then informs the in-vehicle telematics system of the completion of the uploading communication.

If the communication request from the telematics system is for downloading data from the Internet (stage 304), the device will retrieve the profile (server location, size, fragmentation size, number of fragments, etc.) of the data to be downloaded from the P2P server via the Internet at stage 305. The device's P2P Arbiter determines which mobile device downloads which fragments of data from which server at stage 310. Based on this traffic allocation decision, each mobile device downloads the assigned fragments of data from the Internet source and sends them to the P2P arbiter via tethering connection. Finally, the P2P arbiter aggregates all the fragments that constitute the desired data at stage 311 and sends the aggregated final data to the in-vehicle telematics. When the upload is deemed complete at stage 312, the process 300 returns to start.

Figure 4:
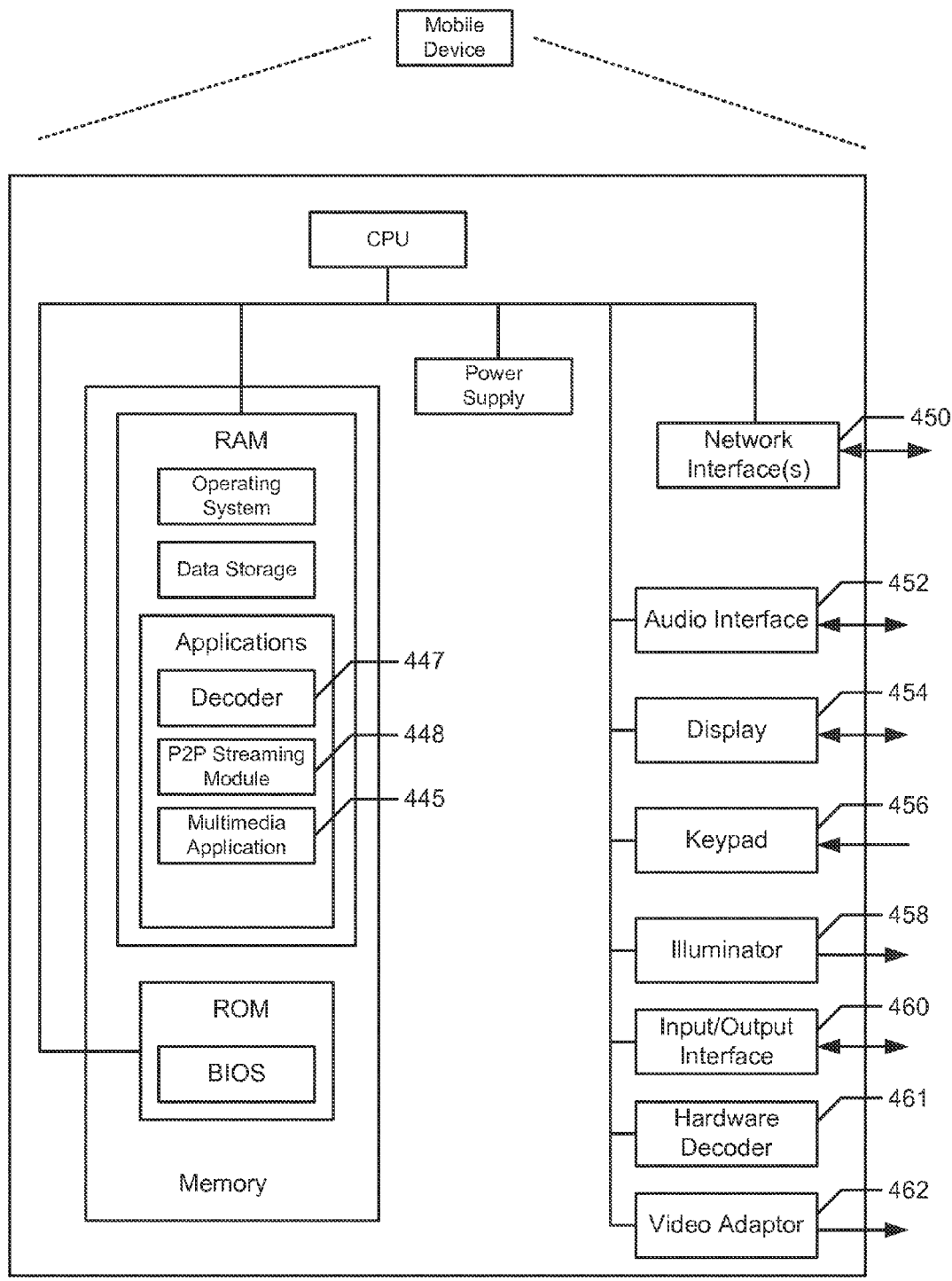
FIG. 4 depicts a schematic diagram of an exemplary mobile device usable within various embodiments of the invention.

FIG. 4 shows one embodiment of device 400 that may be included in system 100 implementing the invention. Device 400 may include many more or less components than those shown in FIG. 4. However, the components shown are sufficient to implement an illustrative embodiment for practicing the present invention. Network interface 450 includes circuitry for coupling device 400 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 450 is sometimes known as a transceiver, transceiving device, or network interface card (NIC).

Audio interface 452 is arranged to produce and receive audio signals such as the sound of a human voice. For example, audio interface 452 may be coupled to a speaker and microphone to enable telecommunication with others and/or generate an audio acknowledgement for some action. Display 454 may be a liquid crystal display (LCD), gas plasma, light emitting diode (LED), or any other type of display used with a computing device. Display 454 may also include a touch sensitive screen arranged to receive input from an object such as a stylus or a digit from a human hand. In addition, device 400 may further include video adaptor 462, which is configured to provide video signals to an external display.

Keypad 456 may comprise any input device arranged to receive input from a user. For example, keypad 456 may include a push button numeric dial, or a keyboard. Keypad 456 may also include command buttons that are associated with selecting and sending images. Illuminator 458 may provide a status indication and/or provide light. Illuminator 458 may remain active for specific periods of time or in response to events. For example, when illuminator 458 is active, it may backlight the buttons on keypad 456 and stay on while the device is powered. In addition, illuminator 458 may backlight these buttons in various patterns when particular actions are performed, such as dialing another device. Illuminator 458 may also cause light sources positioned within a transparent or translucent case of the device to illuminate in response to actions.

Device 400 also comprises input/output interface 460 for communicating with external devices, such as a headset. Input/output interface 460 can utilize one or more communication technologies, such as USB, infrared, Bluetooth™, or the like.

Device 400 typically ranges widely in terms of capabilities and features. For example, a cell phone may have a numeric keypad and a few lines of monochrome LCD display on which only text may be displayed. In another example, a web-enabled mobile device such as a PDA may have a touch sensitive screen, a stylus, and several lines of color LCD display in which both text and graphics may be displayed. In still another example, a multimedia-enabled mobile device such as laptop may include a multimedia application 445 such as a video player application, which is configured to render images, videos streams, audio signals, or the like through a multimedia interface such as a color LCD or LED screen or a microphone. In still another example, device 400 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send information.

As depicted in FIG. 4, in general, device 400 also includes a decoder. In one embodiment, the decoder is part of the multimedia application 445 described above or a standalone application 447 running in parallel with the multimedia application on the device. In another embodiment, the decoder is provided in a hardware module 461 as part of the hardware circuit in the device. The decoder is configured to decode multimedia data from the data stream received by the device and feed the decoded data to the multimedia application 445 such as the video player. Depending on the coding technique used in the encoded data stream, the decoder can perform loss or lossless decoding. The decoder may utilize proprietary decoding techniques or standardized decoding techniques defined in standard specifications such as H.261, H.264, JPEG, or MPEG.

Device 400 further include a P2P streaming module, which is configured to process the coded data stream received from other computing devices through network interface 450 in accordance with a P2P transmission scheme. The P2P streaming module can be part of the decoder 447 or 461 as described above or can be a standalone application 445, which operates in conjunction with the decoder. In one embodiment, the P2P streaming module operates on top of the Internet Protocol (IP) or other networking protocol as well known in the art. The P2P streaming module is further configured to provide information that identifies device 400, including a type, capability, name, or the like. In one embodiment, device 400 may uniquely identify themselves through any of a variety of mechanisms, including a phone number, Mobile Identification Number (MIN), an electronic serial number (ESN), mobile device identifier, network address, or other identifier.

In a further embodiment, the P2P streaming module 448 is configured to perform peer indexing and discovery. In particular, the P2P streaming module 448 may broadcast through network interface 450 a message, such as the "Hello" message. The message also identifies certain data, such as a digital video file, that device 400 requests from other devices in the system. Upon receiving responses, the P2P streaming module 448 identifies a number of network devices that has the requested data and assigns an identification (ID) to each of these network devices. In addition, the P2P streaming module 448 also conducts negotiations with other network devices to determine transmission rates, bandwidth, packet size, etc. For example, the P2P streaming module 448 may exam the responses received from the network devices that have the requested data, and select a predetermined number of network devices according to the uplink data rate or bandwidth offered by these network devices.

In addition, P2P streaming module 448 can further provide data assembling, retransmission request, and error correction. For example, P2P streaming module 448 can generate a copy of the requested data by assembling the data streams received from a plurality of computing devices. Upon discovering that one or more portions of the data are missing or contain errors, P2P streaming module 448 can request retransmissions of the unavailable data and/or correct the errors by applying an error correction method to the received data.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for capability-aware network load distribution for a vehicle telematics system, the method comprising:
   receiving, by a traffic aggregator device in communication with the vehicle telematics system, a communication request from the vehicle telematics system corresponding to data to be downloaded;
   retrieving, by the traffic aggregator device, a profile of a file from a server, the file corresponding to the data to be downloaded;
   establishing, by the traffic aggregator device, tethering connections with a plurality of mobile devices within the vehicle;
   determining, by the traffic aggregator device, a maximum capability corresponding to each of the plurality of mobile devices;
   determining, by the traffic aggregator device, portions of the data to be downloaded by each of the plurality of mobile devices based on the retrieved profile of the file, wherein sizes of the portions of the data to be downloaded by each of the plurality of mobile devices are based on the determined maximum capability corresponding to each of the plurality of mobile devices;
   instructing, by the traffic aggregator device, each of the plurality of mobile devices to download respective determined portions of the data to be downloaded by each of the plurality of mobile devices;
   receiving, by the traffic aggregator device, the respective determined portions of the data to be downloaded from each of the plurality of mobile devices; and
   transmitting, by the traffic aggregator device, to the vehicle telematics system the received portions of the data to be downloaded.

2. The method according to claim 1, wherein, prior to the transmitting, the method further comprises aggregating the received portions of the data into a data object; and
   wherein transmitting to the vehicle telematics system the received portions of the data to be downloaded comprises transmitting to the vehicle telematics system the received portions of the data to be downloaded as the data object.

3. The method according to claim 1, wherein, prior to establishing tethering connections with the plurality of mobile devices, the method further comprises:
   verifying that the plurality of mobile devices are available.

4. The method according to claim 1, wherein the determined maximum capability corresponding to each of the plurality of mobile devices is based on at least one of throughput and latency corresponding to each of the plurality of mobile devices.

5. The method according to claim 1, wherein the sizes of the portions of the data to be downloaded received from each of the plurality of mobile devices are directly proportional to the determined maximum capabilities corresponding to each of the plurality of mobile devices.

6. A system for capability-aware network load distribution for a vehicle telematics system, the system comprising:
   a vehicle telematics system, configured to communicate with a traffic aggregator device; and
   a traffic aggregator device, configured to:
      receive a communication request from the vehicle telematics system corresponding to data to be downloaded ;
      retrieve a profile of a file from a server, the file corresponding to the data to be downloaded;
      establish tethering connections with a plurality of mobile devices within the vehicle;
      determining a maximum capability corresponding to each of the plurality of mobile devices;
      determine portions of the data to be downloaded by each of the plurality of mobile devices based on the retrieved profile of the file, wherein sizes of the portions of the data to be downloaded by each of the plurality of mobile devices are based on the determined maximum capability corresponding to each of the plurality of mobile devices;
      instruct each of the plurality of mobile devices to download respective determined portions of the data to be downloaded by each of the plurality of mobile devices;
      receive the respective determined portions of the data to be downloaded from each of the plurality of mobile devices; and
      transmit to the vehicle telematics system the received portions of the data to be downloaded.

7. The system according to claim 6, wherein the traffic aggregator device is further configured to aggregate the received portions of the data into a data object prior to transmitting to the vehicle telematics system the received portions of the data to be downloaded.

8. The system according to claim 6, wherein the traffic aggregator device is further configured to verify that the plurality of mobile devices are available.

9. The system according to claim 6, wherein the determined maximum capability corresponding to each of the plurality of mobile devices is based on at least one of throughput and latency corresponding to each of the plurality of mobile devices.

10. A method for capability-aware network load distribution for a vehicle telematics system, the method comprising:
- receiving, by a traffic aggregator device in communication with the vehicle telematics system, a communication request from the vehicle telematics system corresponding to data to be uploaded;
- establishing, by the traffic aggregator device, tethering connections with a plurality of mobile devices within the vehicle;
- determining, by the traffic aggregator device, a maximum capability corresponding to each of the plurality of mobile devices;
- receiving, by the traffic aggregator device, from the vehicle telematics system, the data to be uploaded;
- transmitting a profile of a local file to be uploaded to the plurality of mobile devices, the local file corresponding to the data to be uploaded; and
- subsequent to transmitting the profile of the local file to be uploaded, transmitting, by the traffic aggregator device, portions of the data to be uploaded to each of the plurality of mobile devices, wherein sizes of the portions of the data to be uploaded transmitted to each of the plurality of mobile devices are based on the determined maximum capability corresponding to each of the plurality of mobile devices.

11. The method according to claim 10, wherein, prior to establishing tethering connections with the plurality of mobile devices, the method further comprises:
- verifying that the plurality of mobile devices are available.

12. The method according to claim 10, wherein the determined maximum capability corresponding to each of the plurality of mobile devices is based on at least one of throughput and latency corresponding to each of the plurality of mobile devices.

13. The method according to claim 10, wherein the sizes of the portions of the data to be uploaded transmitted to each of the plurality of mobile devices are directly proportional to the determined maximum capabilities corresponding to each of the plurality of mobile devices.

14. The method according to claim 10, wherein the profile includes at least one of server location, file size of the local file, fragmentation size for the local file, and number of fragments for the local file.

15. The method according to claim 10, further comprising:
- monitoring a transmission status of each of the plurality of mobile devices during said transmitting until transmission of all the portions of the data to be uploaded is completed.

16. The method according to claim 10, further comprising:
- signaling the vehicle telematics system regarding completion of the transmitting.

17. The method according to claim 10, wherein the communication request is a request to upload vehicle diagnostic information.

\* \* \* \* \*